Aug. 20, 1963  D. ROSE  3,101,316
PROCESS OF TREATING WATER
Filed Sept. 12, 1960

CYCLE NO. 1
(CONDITIONING)

CYCLE NO. 2
(BACKWASH)
NO. 1 SOL. OPEN ONLY

CYCLE NO. 3
(BRINING)
NO. 1 & NO. 2 SOL. OPEN

CYCLE NO. 4
(SLOW RINSE)
NO. 1 & NO. 2 SOL. OPEN

CYCLE NO. 5
(FAST RINSE & REFILL)
NO. 2 SOL. OPEN ONLY

INVENTOR
DONALD ROSE
BY Beale & Jones
ATTORNEYS

United States Patent Office 3,101,316
Patented Aug. 20, 1963

3,101,316
PROCESS OF TREATING WATER
Donald Rose, Dayton, Ohio, assignor of one-half to
Ronald D. Baker, Dayton, Ohio
Filed Sept. 12, 1960, Ser. No. 55,239
6 Claims. (Cl. 210—35)

This invention is directed to improvements in a method of treatment of water to remove hardness, iron in solution and particularly iron and turbidity in suspension.

This invention is a continuation-in-part of my copending applications Serial No. 707,267, filed January 6, 1958, now U.S. Patent 3,044,626, issued July 17, 1962; Serial No. 785,237, filed January 6, 1959, now U.S. Patent 3,014,497, issued December 26, 1961; and Serial No. 21,720, filed April 12, 1960, now U.S. Patent 3,080,975, issued March 12, 1963.

It is an object of the invention to treat water to remove hardness and turbidity including iron in solution and iron in suspension.

Another object of the invention is to make maximum use of an ion exchange mineral in the treatment of water to remove hardness, iron in solution and turbidity and iron in suspension.

A further object of the invention is to provide treatment of water with an ion exchange synthetic resin mineral bed including down flow softening and regeneration of the mineral bed by up flow backwashing, down flow of the regenerate solution, slow rinse down flow of the bed and down flow fast rinse of the bed to remove regenerate solution pockets and turbidity and iron deposited in the mineral bed where iron bearing waters are treated.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

For a more completely understanding of the nature and scope of the invention refernce may be had to the drawing in which FIG. 1 is a diagram illustrating the water treatment cycle of water through a mineral bed;

Throughout the description of the diagrams of flow, like reference numbers and characters refer to similar parts or elements.

Synthetic resin minerals have been used for some time in the treatment of water to remove hardness and iron in solution. The mineral bed will also filter out turbidity and iron that may be in suspension. Applicant has found that to obtain the most efficient utilization of the minerals used for the mineral bed certain procedures must be carried out in the use of the mineral bed and its rehabilitation. It is known that the minerals in the water causing the so called hardness may be treated and certain iron traces in solution can likewise be removed by the reaction in the mineral bed but turbidity and iron in suspension in the waters being treated has not heretofore been properly reduced and elimnated to provide an iron and turbidity free water.

The invention is thus directed to a solution of this problem to obtain the maximum usefulness of a given mineral bed and particularly to also remove turbidity and iron in suspension where the waters treated are iron bearing waters.

It is assumed that the mineral bed when new has the characteristics and capacity to remove the mineral hardness and iron in solution and suspension. The invention is directed to the proper regeneration and handling of this bed to restore its original or substantial original condition. It is recognized that the iron slippage through the mineral bed will not increase much more than 20 to 30%. For example, if the slippage through a new condition mineral is ½ part per million it will not increase to over ¾ to 9/10 per million.

Removal of iron by the cation exchange process is similar to and simultaneous with the removal of calcium and magnesium. The removal of turbidity and insoluble iron that is trapped in the mineral bed and not fully backwashed out is accomplished by this process if treatment of the mineral bed in its rehabilitation is followed as will be described according to the invention.

Various types of minerals may be utilized. The cation exchange material may be green sand, zeolite which term is applied to insoluble, solid materials which have the property of exchanging various ions with which they come in contact and such zeolite materials include synthetic resin materials. Various regenerate materials may be utilized to rehabilitate the spent mineral bed. The sodium zeolite softening process is here used and this is also referred to as cation exchange on the sodium cycle. Sodium chloride may be used as the regenerate material.

Figure 1:
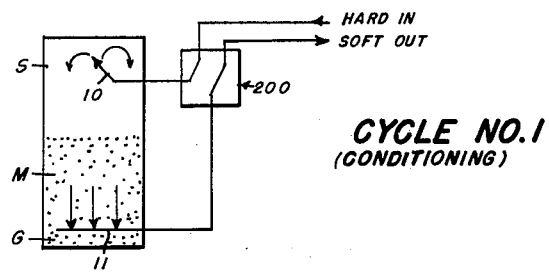

Reference to the drawing shows in FIG. 1 a softener tank S having a mineral bed M on a layer of quartz filter sand G. The softener tank has an inlet conduit 10 at the top and an outlet conduit 11 at the bottom. The inlet 10 and outlet 11 are connected with an automatically controlled multiple valve assembly generally indicated at 200 as shown in my referred to copending applications which is fully operated by two solenoid actuators. The flow in the conditioning or service cycle 1 is with the hard water flowing down through the mineral bed M.

Figure 2:
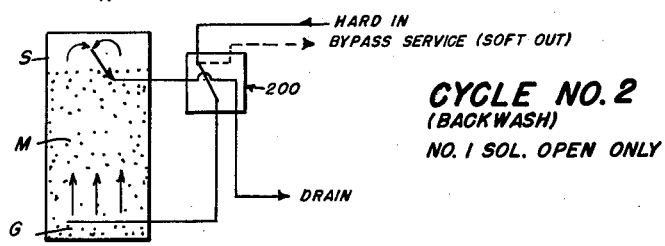
FIG. 2 is a similar diagrammatic showing but showing up flow backwashing of the mineral bed in reconditioning the same.

In FIG. 2 there is illustrated the start of the reconditioning, cycle No. 2, an up flow backwash whose rate is such as will be described for a typical synthetic mineral such as to afford about a 40 to 50% expansion. This up flow backwash loosens the mineral bed and removes some of the filtered or trapped turbidity and in iron bearing waters iron in solution that has been physically trapped by the mineral bed. Backwash also stratifies the mineral bed wherein the smaller minerals tend to stratify out on top. This backwash is at a recommended rate usually specified by the mineral manufacturer to accomplish loosening of the mineral without washing it away with the entrapped material being backwashed from the bed. The backwash is led to a drain as a point of disposal.

Figure 3:
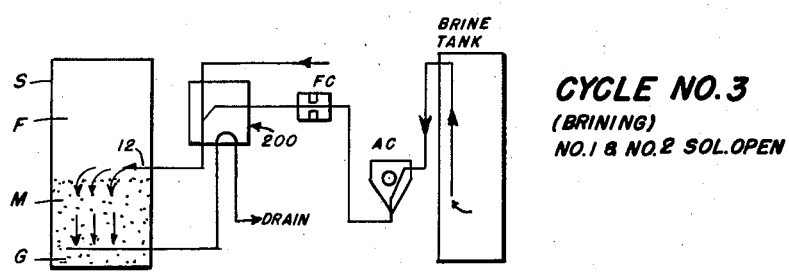
FIG. 3 is a showing of the flow in the system during introduction of regenerate solution to the mineral bed from regenerate solution storage.

Referring now to FIG. 3 there is in addition shown diagrammatically a typical brine tank or regenerate solution supply. Along with the brine or regeneration solution supply line there is an air check AC and a flow control valve FC whereby a given quantity of brine will flow in step with a pressure supply range variation. It is essential to remove air as much as possible. It is to be noted that the regenerate solution is introduced at 12 just above the mineral bed M and below the head of free board water F and constitutes cycle No. 3.

Figure 4:
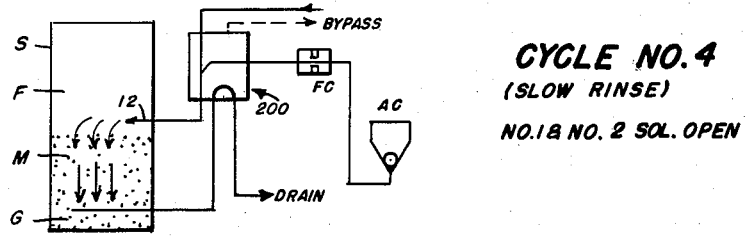
FIG. 4 is a diagrammatic showing of the slow rinse down flow of the mineral bed.

Following the regenerate solution introduction there is a slow rinse down through the mineral bed and in the illustration in FIG. 4, cycle No. 4, the slow rinse water is introduced just above the mineral bed M through the same conduit 12 through which the regenerate solution was introduced.

Figure 5:
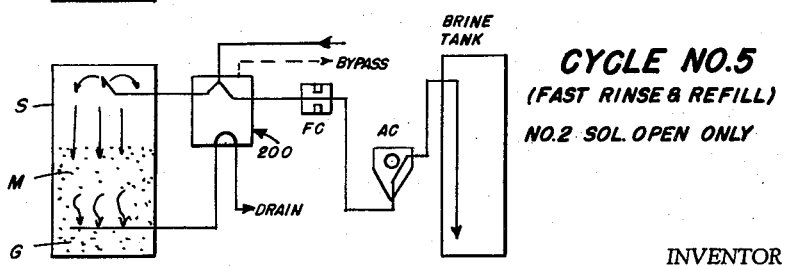
FIG. 5 is a diagrammatic showing of the fast rinse and regenerate water replacement.

In FIG. 5 there is illustrated cycle 5 which is the very important fast rinse according to the invention. The fast rinse is at a rate about twice that of the backwash rate for a synthetic resin mineral. It will be in quantity about 20 gallons per cubic feet of mineral in the bed or in terms of softener tank capacity it will be about two times the softener tank capacity with mineral installed. These rates and amounts of backwash will for the majority of cases remove any regenerate solution pockets left in the mineral bed, remove any left turbidity and iron in suspension that may have been left in the mineral bed and will repack the mineral bed. Thus, when the No. 1 cycle of service or softening takes place there will be no carry over of regenerate solution and turbidity and in the case of iron bearing waters there will be no trace of iron in suspension carried over which is so detrimental.

The softener bed as illustrated is of a depth of about 30 inches.

*Example of a Mineral Used Sodium Cycle Operation*

Type—Cation exchange resin—chemically termed a mono-functional, sulfonated, copolymer of styrene and divinylbenzene.

Manufacturer—Dow Chemical Company
Tradename—Nalcite HCR-W
Properties as shipped (sodium form):

Shipping weight_____ 53 lb./cu. ft.
Density_____ 50 lb./cu. ft. approx.
Moisture content_____ 45% approx.
Void volume_____ 3 gal/cu. ft. approx.
True density, specific gravity_____ 1.28.
pH produced by resin in brine_____ 6.5 to 9.0 pH.

Size, color and shape — The resin material consists of water white spheroidal particles with sphericity greater than 95%. The particle size distribution is usually 96% smaller than 16 mesh and larger than 40 mesh.

Flow rate—6-10 gal. per minute per square foot of bed area.

Backwash—A backwash rate of 8 gal. per sq. foot per minute of mineral bed at 78° F. of wash water will give about a 50% expansion of the bed. To maintain a specific expansion the flow should be changed 0.75% for each degree F. wherein there is an increased flow rate with increased temperature of water.

In carrying out the fast rinse, cycle No. 5, according to the invention the following minimums should govern:

Total gallons of fast rinse water is based on the number of cubic feet of mineral in bed and with a mineral of the type set out in the example, a synthetic resin mineral, there should be 20 gal. of fast rinse water per cu. ft. of mineral bed. In terms of softener tank capacity with mineral installed there should be an amount equal to two times tank capacity or greater. The flow rate in gallons per minute is equivalent to at least twice the backwash rate to give a 40% to 50% expansion of the mineral bed.

I claim as my invention:

1. The process of ion exchange using an ion exchange high capacity resin mineral bed with a freeboard head of water thereabove with an inlet above the freeboard and an outlet below the mineral bed which comprises the steps of (a) passing water through said inlet and freeboard spaced and down through said bed during the service phase and withdrawing the treated water after treatment thereof from said outlet to a point of use; reconditioning said bed by (b) backwashing upwardly by introducing water at the outlet below the bed and withdrawing same through said inlet to a point of disposal at a rate so as to expand the mineral bed about forty percentum without removal of mineral through said inlet, (c) introducing a regenerate solution above said bed and below said freeboard space and withdrawing the resultant regenerate solution from said outlet below the bed to a point of disposal, (d) slow rinsing said bed by introducing water above said bed and below said freeboard and (e) fast rinsing by introducing water at said inlet and withdrawing from said outlet below the bed to a point of disposal at a rate about twice the backwash rate of flow whereby to remove regenerate solution pockets left in the mineral and freeboard space and to remove any turbidity and iron deposits and to repack said mineral bed whereupon a subsequent service phase will provide conditioned water without traces of regenerate solution and iron deposit in case of iron bearing waters being treated.

2. The process of ion exchange using a cation exchange high capacity resin mineral bed with a freeboard head of water thereabove with an inlet above the freeboard and an outlet below the bed which comprises the steps of (a) passing water through said inlet and freeboard space and down through said bed during the service phase and withdrawing the treated water after treatment thereof from said outlet to a point of use; reconditioning said bed by (b) backwashing upwardly by introducing water at the outlet below the bed and withdrawing same through said inlet to a point of disposal at a rate so as to backwash and expand said bed by about 40% without removal of mineral through said inlet, (c) introducing a substantially air free sodium chloride solution above said bed and withdrawing the resultant solution from said outlet below the bed to a point of disposal, (d) slow rinsing said bed by introducing water above said bed and (e) fast rinsing by introducing water above said bed in a minimum quantity of about 20 gallons per cubic foot of said mineral in bed and at a rate about twice the backwash rate of flow whereby to remove any sodium chloride pockets left and to remove turbidity and iron deposits and to repack said mineral bed whereupon a subsequent service phase will provide conditioned water without traces of sodium chloride and iron deposits in case iron bearing waters are being treated.

3. In a cyclic process for treating water in an ion exchange process using an ion exchange mineral bed, said ion exchange mineral being characterized as a mono-functional, sulfonated, copolymer of styrene and divinylbenzene with particle size distribution about 96% smaller than 16 mesh and larger than 40 mesh and having said particles spheroidal to about 95% of the particles, wherein there is down flow treatment of the water through the bed, an up flow backwash of water through the bed in an amount of approximately 8 gallons per square foot per minute of said mineral bed at a rate with backwash water temperature of about 78° F. to give about a 50% expansion of the mineral bed and wherein the rate of backwash flow should be changed 0.75% for each degree F. change to maintain the approximate 50% expansion wherein there is an increased flow rate with increased temperature of water, a regeneration of the bed by passing regenerate solution downwardly therethrough, a slow rinse down through the bed, the improvement of a fast down flow water rinse through the mineral bed at a rate about equal to twice said backwash rate of flow to remove any pockets of regenerate solution and to remove residual turbidity and residual iron deposits and to repack said mineral bed whereupon a subsequent service phase will provide conditioned water without traces of regenerate solution and iron deposits in case iron bearing waters are being treated.

4. A cyclic process for treating water according to claim 3 wherein the ion exchange mineral is cation exchange resin and wherein the regenerate is a solution of sodium chloride.

5. In a cyclic process for treating water in an ion exchange process using an ion exchange high capacity resin mineral bed wherein there is (a) down flow treatment of the water through the bed at a rate, (b) an up flow backwash of water through the bed so as to expand the mineral bed approximately 40 to 50% without removal of mineral, (c) introduction of a regenerate solution down through said bed from above the bed, (d) slow rinsing of said bed by passing water down through said bed, the improvement of (e) fast rinsing said ion exchange mineral bed with a down flow therethrough by a quantity of about 20 gallons of water per cubic foot of mineral in said bed and at a rate of about twice the backwash rate of said bed to remove any pockets of regenerate solution left in the mineral bed to remove any turbidity and iron in suspension and to repack said mineral bed.

6. A cyclic process for treating water according to claim 5 wherein the ion exchange mineral is cation exchange resin and wherein the regenerate is a solution of sodium chloride.

References Cited in the file of this patent

UNITED STATES PATENTS

| | | |
|---|---|---|
| 2,052,515 | Pick | Aug. 25, 1936 |
| 2,466,662 | Mindler | Apr. 5, 1949 |
| 2,855,364 | Roberts | Oct. 7, 1958 |
| 2,962,437 | Lindsay | Nov. 29, 1960 |